United States Patent [19]

Bowen

[11] E Patent Number: Re. 32,588

[45] Reissued Date of Patent: Feb. 2, 1988

[54] VALVE ACTUATOR SYSTEM

[75] Inventor: Stanley Bowen, Tustin, Calif.

[73] Assignee: The Babcock & Wilcox Company, New Orleans, La.

[21] Appl. No.: 873,732

[22] Filed: Jun. 12, 1986

Related U.S. Patent Documents

Reissue of:

[64] Patent No.: 4,215,844
Issued: Aug. 5, 1980
Appl. No.: 937,242
Filed: Aug. 28, 1978

[51] Int. Cl.[4] ..... F16K 31/128

[52] U.S. Cl. ..... 251/28; 91/20; 91/31; 91/33; 91/388

[58] Field of Search ..... 251/28, 29, 57; 91/20, 91/31, 388, 33, 361

[56] References Cited

U.S. PATENT DOCUMENTS

| | | | |
|---|---|---|---|
| 2,649,841 | 8/1953 | Jacques | 91/33 |
| 2,974,639 | 3/1961 | O'Connor et al. | 91/388 |
| 3,279,323 | 10/1966 | Asche | 91/20 |
| 3,433,126 | 3/1969 | Hayner et al. | 91/388 X |
| 3,468,126 | 9/1969 | Mercier | 91/388 |
| 3,872,773 | 3/1975 | Denker | 91/388 |
| 3,980,002 | 9/1976 | Jarman et al. | 251/30.05 X |
| 4,037,519 | 7/1977 | Miller et al. | 91/361 |
| 4,043,533 | 8/1977 | Cowley | 251/57 |
| 4,046,059 | 9/1977 | Leonard | 91/388 |
| 4,114,637 | 9/1978 | Johnson | 251/29 |
| 4,136,600 | 1/1979 | Heiser | 91/31 |
| 4,335,867 | 6/1982 | Bihlmaier | 251/28 |
| 4,647,004 | 3/1987 | Bihlmaier | 251/28 |

FOREIGN PATENT DOCUMENTS

| | | | |
|---|---|---|---|
| 542831 | 6/1957 | Canada | 91/31 |
| 1431599 | 4/1976 | United Kingdom | 91/31 |

*Primary Examiner*—Martin P. Schwadron
*Assistant Examiner*—Stephen M. Hepperle
*Attorney, Agent, or Firm*—Vytas R. Matas; Robert J. Edwards

[57] ABSTRACT

A pneumatic-hydraulic proportional valve actuator system is provided having a relatively simple and adjustable means of achieving two stroking speeds by the hydraulic actuator, high speed in normal operation and low speed for small position adjustments and for the final part of any large position adjustments. This prevents overshoot and instability of the actuator.

6 Claims, 2 Drawing Figures

VALVE ACTUATOR SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to valve actuator systems and particularly to valve actuator systems using two stroking speeds for the actuation, fast and slow, depending on the degree of required position adjustment of the actuator.

2. Description of the Prior Art

Known valve actuators utilize a single stroking speed and are usually pneumatic, electrohydraulic or electromechanical. Each has its own deficiencies which the present invention overcomes. Pneumatic actuators are necessarily large in size to provide the required force or thrust and suffer from dynamic instability because of the compressible nature of the pneumatic fluid, as well as from overshoot and instability due to the single stroking speed attempting to effect a small actuator position movement. Electromechanical and electrohydraulic actuators although having less sources of instability are usually slow in operation in comparison to the pneumatic actuators.

Examples of such known prior art devices may be found in the following U.S. Pat. Nos. 3,603,083 and 2,938,347.

SUMMARY OF THE INVENTION

The present invention solves the mentioned problems associated with prior art devices as well as others by providing a pneumatic-hydraulic valve actuator system which is compact in size, fast in operation, capable of developing a high thrust, and fire-safe in hazardous environments.

The system utilizes a hydraulic piston to actuate the valve. The piston is connected through a three-position four-way valve to a hydraulic accumulator which is supplied by an air-actuated hydraulic pump. An orifice with a free flow by-pass is mounted in line between the piston and the accumulator to selectively allow two-speed, fast or slow, actuation of the piston. The system controllably supplies the accumulator hydraulic pressure to the piston either through the by-pass to provide high volume fluid flow and speedy valve actuation for large valve movements or through the constricting orifice to provide restricted volume fluid flow and slow valve actuation for small valve movements. This prevents overshoot of the desired valve position resulting in a fast and stable valve actuation system.

In a specific embodiment of the invention the valve is controlled by a pneumatic positioner which compares an input control signal of desired valve position with a feedback signal from the piston of actual valve position to appropriately control the valve to balance the input and feedback signals. If the initial error signal is large, the system will open a valve in the by-pass to allow fast valve actuation until the error signal is within a predetermined range at which time the system will close the valve in the by-pass preventing flow therethrough and forcing the flow through the orifice to allow the valve to slowly come to the desired position where the signals are balanced. The valve in the signal balanced position disconnects the accumulator from the piston to hydraulically lock the piston and valve in the predetermined position. Thus a loss in supply air would lock the valve in the last predetermined position since the air-actuated pump and positioner do not affect the null position of the piston.

In view of the foregoing it will be seen that one aspect of the present invention is to provide a two-speed valve actuator system which is stable.

Another aspect of the present invention is to provide a two-speed valve actuator system which will lock the valve in place at desired valve positions.

These and other aspects of the invention will be more clearly understood upon review of the following description of the preferred embodiment when considered with the accompanying drawing.

DESCRIPTION OF THE PREFERRED EMBODIMENT

Figure 1:
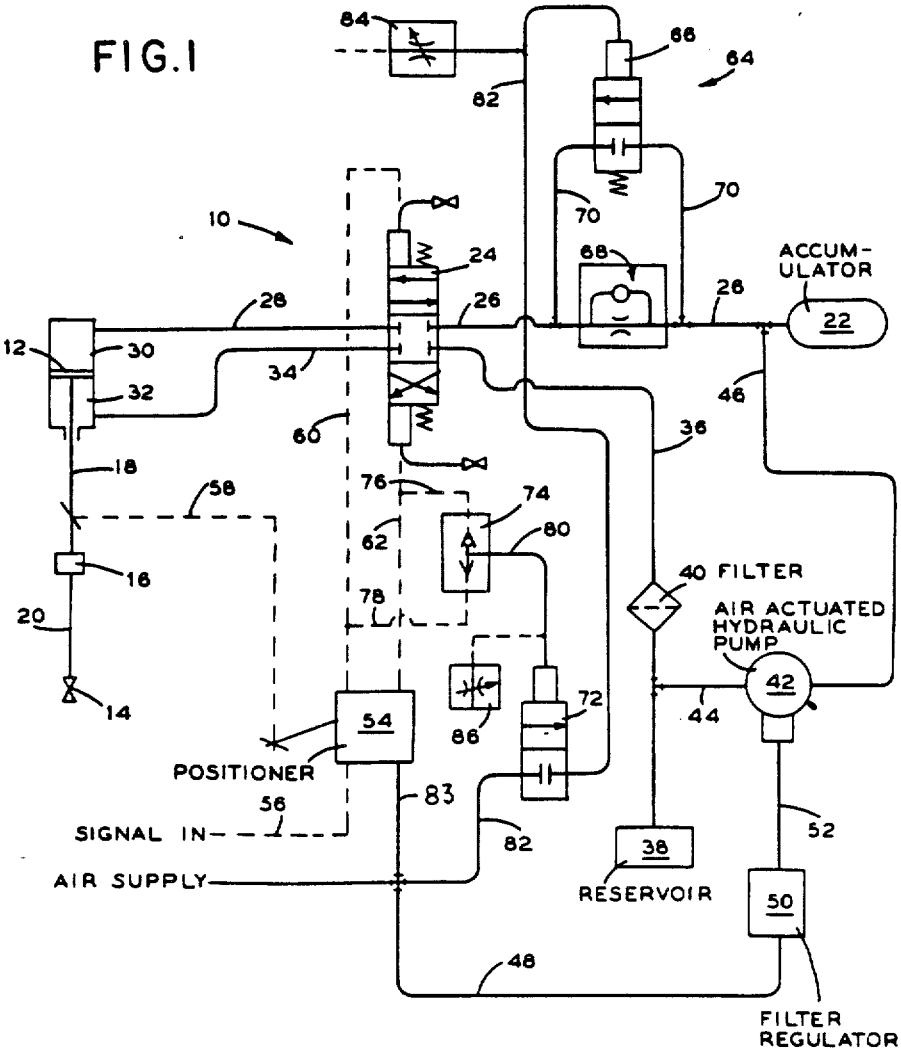
FIG. 1 is a schematic representation of the valve actuator system of the present invention.

Referring now to the drawing, FIG. 1 shows a pneumatic-hydraulic valve actuator system 10 having a hydraulic piston 12 which is used to modulate a valve 14 by way of a physical coupling 16 connecting a stem 18 of the hydraulic piston 12 to a valve stem 20 of the valve 14. The hydraulic piston 12 is selectively pressurized by an accumulator 22 which is connected to this piston 12 by way of a three-position four-way valve 24. The valve 24 is shown to be in the null position with supply line 26 from the accumulator 22 being closed to supply line 28 which feeds one side 30 of the piston 12. Similarly, the other side 32 of the piston 12 is blocked by this position of the valve 24 from exhausting any fluid from the side 32 along exhaust line 34 to exhaust line 36 which feeds the hydraulic reservoir 38 through a filter 40. With the valve in this position the piston 12 is incapable of any movement since the piston 12 is hydraulically locked thereby assuring a stable position.

The accumulator 22 is charged up to approximately 3,000 psi pressure by an air-actuated hydraulic pump 42 such as the Haskel Model P-35C Air-Actuated Hydraulic Pump. The pump 42 draws hydraulic fluid from the reservoir 38 along line 44 and exhausts it along line 46 to the accumulator 22. The pump 42 is operated by regulated air supply of approximately 50 psi which is supplied to the pump 42 from air supply line 48 regulated down to 80 psi by the regulator 50 and supplied to the pump 42 along line 52. The pump 42 maintains its output to the accumulator 22 until it has charged up the accumulator 22 to substantially 3,000 psi at which time the pump stalls itself out since it is a non-continuously operating pump which may be started and stopped in any number of known ways.

The position of the valve 14 is monitored by a penumatic positioner 54 such as the Bailey Controls Company Model P58-4 Pneumatic Positioner. The positioner 54 compares the input signal supplied along line 56 indicative of desired valve 14 position with a feedback signal of actual valve position supplied to the positioner 54 along feedback line 58. In this particular instance the feedback line 58 is an actual mechanical linkage between the piston stem 18 and the positioner 54. As long as there is no difference between the input control signal originating from line 56 and the feedback signal from line 58, the positioner 54 establishes a $\phi$ psi pneumatic output signal to lines 60 and 62 which connect opposite ends of the valve 24 thereby maintaining the valve 24 in the balanced or null position shown in the drawing. Should the input signal 56 change to indicate a different valve 14 position, the positioner 54 will detect a difference between the input signal 56 and the feedback signal 58 causing either line 60 or line 62 to be pressurized depending upon the polarity of the signal difference between the input signal and the feedback signal. Assuming that the difference between the input signal 56 and the feedback signal 58 indicates a valve closing, the line 62 will remain at $\phi$ psi while line 60 is pressurized. This will cause the valve 24 to switch to the position connecting supply line 26 to supply line 28 and exhaust line 34 to exhaust line 36. The pressure of the accumulator 22 is now supplied by this connection to the side 30 of the piston 12 through a restrictor and by-pass assembly 64, whose control or function will be discussed later, while the other side 32 of the piston 12 is now free to be exhausted into the reservoir 38. This unbalances the piston 12 and causes it to move down towards the valve at one of two speeds as determined by the assembly 64. As the piston 12 moves, the feedback signal 58 changes until it balances the supply signal 56 at which time the line 60 will vent through the positioner 54 causing the valve 24 to return to the null position hydraulically locking the piston 12 in the new position. It will be seen that the present system provides proportional valve actuation wherein the movement of the stem 18 is directly proportional to the input signal 56 indicative of desired valve position.

Figure 2:
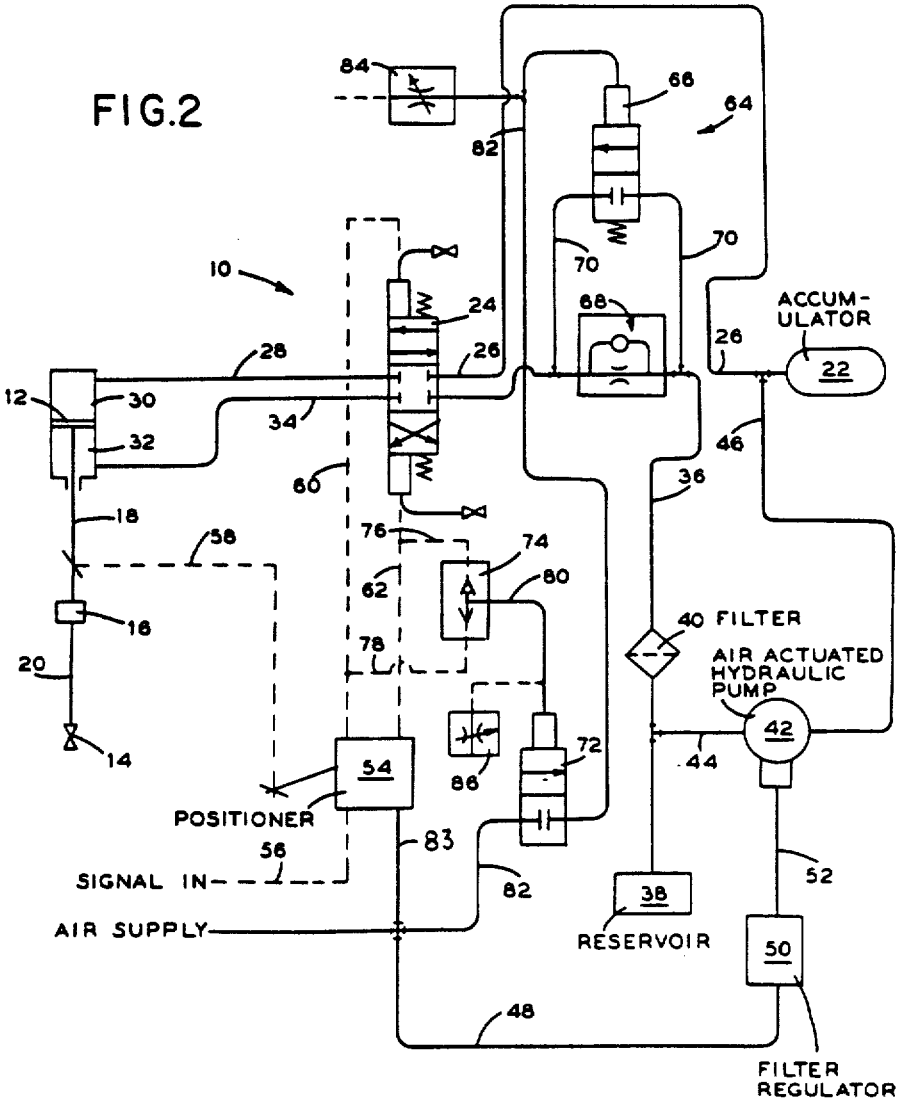
*FIG. 2 is a schematic representation of an alternate actuator system of the present invention.*

Since the positioner 54, as all instruments, has a certain dead band and since the speed of the piston movement is extremely fast due to the high pressures provided by the accumulator 22, the restrictor and by-pass assembly 64 is placed in the line 26 to control the flow of hydraulic fluid into either of the piston sides 30 or 32 or restrict the flow from sides 30 or 32 to thereby control the speed of piston movement 12 in a speedy and stable manner. Note that the by-pass assembly can be in line 26 *as seen in FIG. 1* or 36 *as seen in FIG. 2*, when in line 36 the two-way valve 66 responds faster, because of less pressure to work against. The assembly 64 is controlled by a two-position normally closed valve 66 to provide a first fast speed for large piston 12 movement and a second slow speed for small piston movement. This two-speed movement makes the system both fast and stable and allows the piston 12 to come to the new position required by the input signal 56 in the minimum amount of time without causing oscillations or overshooting of the piston 12 around the desired position.

The restrictor and by-pass assembly 64 includes a restrictor orifice 68 mounted directly in line 26 or 36 to control the volume of fluid flow from the accumulator 22 to the hydraulic cylinder and piston 12. This flow will be relatively slow due to the predetermined restrictor and will thus result in a relatively slow piston 12 reaction and movement. A by-pass line 70 is connected across the restrictor orifice 68 with the normally closed two-position valve 66 mounted in the by-pass line 70 to prevent fluid flow across the restrictor orifice 68 in the normal valve 66 position. In the normal position of valve 66, fluid has to flow through the restrictor. The valve 66 is controlled between its open and closed position by a second two-position normally closed valve 72 which is a high pressure relay normally closed and which is relatively small and quick-acting in comparison to the valve 66 which is relatively large in order to provide a large fluid flow capacity through the by-pass line 70. The control valve 72 is moved between its normally opened and closed position by a high pressure selector switch 74 connected across lines 60 and 62.

Turning to the operation of the forementioned devices, it will be seen that when the valve 14 is in a balanced position the pressure signals applied to lines 60 and 62 are $\phi$ psi. Thus causing the selector switch 74 to be at $\phi$ psi. Thus no pressure or force is applied to the high pressure relay 72 along line 80 from the switch 74 maintaining the high pressure relay 72 in the closed position. The closed position of the relay 72 prevents supply air flowing from line 82 to reach the valve 66. Whenever a large movement of the valve is required, a great error signal will result between the input signal and the feedback signal. As was mentioned, this will cause one of the lines 60, 62 to become pressurized while the other line will remain at $\phi$ psi. Note that the selector switch 74 always lets the higher pressure in line 60 or 62 flow through, and acts like a check valve, never letting pressure feed back into line 60 or 62. This pressure in line 60 or 62 will be sensed by the switch 74 and the net pressure will be transmitted along line 80 to the control valve 72. If this pressure is sufficiently large, the control valve 72 will be switched to its open position allowing supply air to flow along line 82 to the valve 66. Valve 66 will now be switched to the open position and will allow fluid flow from the accumulator 22 through the by-pass line 70 to flow to the valve 24 and therefrom to the hydraulic cylinder and piston 12 in an unhindered manner. This will provide speedy movement of the piston 12. The movement of the piston 12 will be sensed by the feedback means and transmitted to the positioner 54 along line 58. As the piston 12 approaches the desired position, the positioner 54 will drop the pressure applied to either line 60 or 62 producing a constantly lower net pressure to the switch 74 and therefrom along line 80 to the control valve 72. At a predetermined point of net pressure which is coordinated and preset to a desired percentage of full scale error signal travel, the control valve 72 will no longer be maintained in the open position by the net pressure along line 80. When this happens the control valve 72 will revert to its normally closed position preventing further supply air flow along line 82. The lack of supply air in line 82 will now prevent valve 66 from remaining in its open position and the valve 66 will close preventing flow of fluid from the accumulator 22 along the by-pass line 70. Flow of fluid from the accumulator 22 will now have to occur through the restrictor orifice 68. This will significantly cut down the volume of fluid flow and will cause a decrease in the speed of piston 12 travel. This is a desired condition since the piston 12 is now close to its desired position. Thus overshoot of the desired position will be prevented and the remaining movement of the piston 12 will occur in a manner approaching a critically damped condition resulting in stable and speedy control. When the desired piston 12 and thus valve position is reached the error signal becomes zero and the positioner 54 again balances the pressure in lines 60 and 62 resulting in a zero net pressure applied to the relay 74. Reset of the valve 66 is accomplished by an adjustable bleed orifice 84 connected to line 82 while reset of the control valve 72 is accomplished through adjustable bleed valve 86 connected to line 80. Should the next error signal be of a relatively small magnitude indicating a small piston 12 position change, the unbalance in pressure between lines 60 and 62 would be small and the net pressure and force along line 80 to control valve 72 would be insufficient to change it from its closed to open position. Thus supply air would be prevented from flowing through line 82 and valve 66 would remain in the closed position preventing flow along by-pass line 70. Thus for small error signals the movement would be only slow since flow would occur from the accumulator 22 always through the restrictor orifice 68. The two-speed operation of the piston 12 will occur only in situations where large error signals are developed.

Should the signal 56 be changed to now indicate a valve 14 up position the line 60 would remain at $\phi$ psi, while line 62 would be pressurized by the positioner 54. This would drive the valve 24 up into its third position causing the line 26 to be connected to the line 34 while the line 28 is connected to the line 36. The effect of this would be to pressurize the opposite side 32 of the piston 12 while the first side 30 of the piston 12 is vented to the reservoir 38. The unbalance of the piston 12 would now be in the opposite direction of that previously disclosed and the piston 12 would now move up in the manner discussed previously causing the valve 14 to also be moved in the up position in the speedy and stable manner effected by the two-speed valve actuator of the present invention.

In the event that air supply is lost to the system 10 the piston 12 still remains hydraulically locked. The piston 12 may be manually moved by depressing either side of the valve 24 to connect the piston 12 to the accumulator 22. The accumulator 22 maintains its charge of 3,000 psi even though the pump 42 is no longer running since the pump 42 is not a continuously operating pump but one that charges up the accumulator and then stalls itself out. Even without any air being supplied to the positioner 54 the valve 24 maintains its middle null position since both lines 60 and 62 are equally affected by the loss of supply air to the positioner 54 to maintain the valve 24 in balance.

Certain improvements and modifications will occur to those skilled in the art upon reading this specification. Clearly the basic concepts disclosed herein could just as easily be applied to an electrical valve actuator. It will be understood therefore that such improvements and modifications were deleted herein for the sake of conciseness and readability but are within the scope of the claims.

I claim:

1. A valve actuator system comprising:

pressure source means including an accumulator charged to a predetermined pressure;

piston means connectable to a valve control member for providing linear motion in response to pressure applied from said pressure source means;

positioner [means] for establishing control signals in response to differences between input signals to said positioner [means] indicative of desired valve positions and feedback signals to said positioner [means] indicative of actual valve positions; and means for moving said piston means at one of two speeds in response to the magnitude of the control signals from said positioner [means] including a restrictor and by-pass assembly connected [between said accumulator and said piston means] *to an exhaust line of a three position valve* to provide two different fluid flow volumes depending on the magnitude of the control signals *directly applied* from said positioner [means] *to said three position valve.*

2. A valve actuator system as set forth in claim 1 wherein said pressure source means includes:

an air-actuated hydraulic pump; and said accumulator is connected to said air-actuated hydraulic pump to be hydraulically charged to said predetermined pressure by said pump.

3. A valve actuator system as set forth in claim 2 [including a] *wherein said* three-position valve *is* connected between said *piston means and said* accumulator and said moving means having a first position responsive to a first control signal for preventing flow from said accumulator to said piston means, a second position responsive to a second control signal for allowing flow from said accumulator to one side of said piston means to cause linear motion in a first direction, and a third position responsive to a third control signal for allowing flow from said accumulator to the opposite side of said piston means to cause linear motion in a second direction opposite said first position.

4. A valve actuator system as set forth in claim 3 wherein said positioner [means] includes:

input signal means for establishing a signal indicative of desired control valve position;

feedback signal means for establishing a signal indicative of actual valve position;

a control unit for comparing the signal from said input means with the signal from said feedback means and applying the first control signal to said valve when said input signal is identical to said feedback signal, the second control signal to said valve when said input signal is less than said feedback signal, and the third control signal to said valve when said input signal is greater than said feedback signal, the magnitude of said second and third control signals being dependent upon the difference between desired and actual control valve position.

5. A valve actuator system as set forth in claim 1 wherein said restrictor and by-pass assembly includes:

a restrictor orifice mounted between said accumulator and said piston means;

a by-pass line connected across said restrictor orifice;

a two-position valve mounted in said by-pass line to *be normally closed to* prevent flow therethrough in a first position while allowing flow therethrough in a second position; *and a second two position valve also normally closed and smaller and quicker acting than said first two position valve which is larger to allow a large flow capacity through the by-pass line and is connected to said second two position valve to control said first two position valve in response to the control signals from said positioner being applied to said second two position valve.*

*6. A valve actuator system as set forth in claim 5 wherein the control signals from said positioner are applied to said second two position valve through a selector switch connected between said positioner and said second two position valve.*

* * * * *